Dec. 5, 1950  L. E. LA BRIE  2,532,670
BRAKING SYSTEM FOR MOTOR VEHICLES
Filed Nov. 20, 1946  3 Sheets—Sheet 3

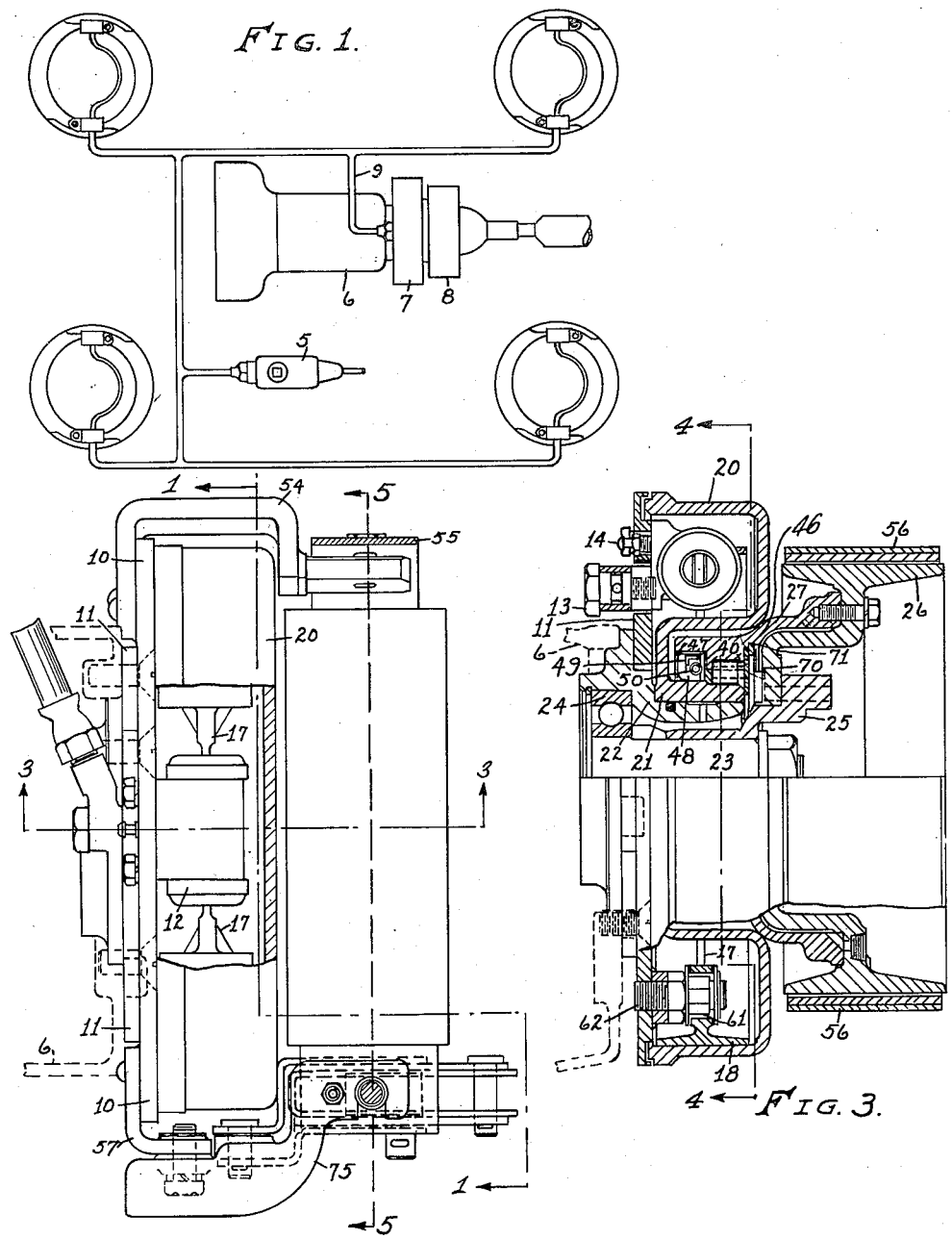

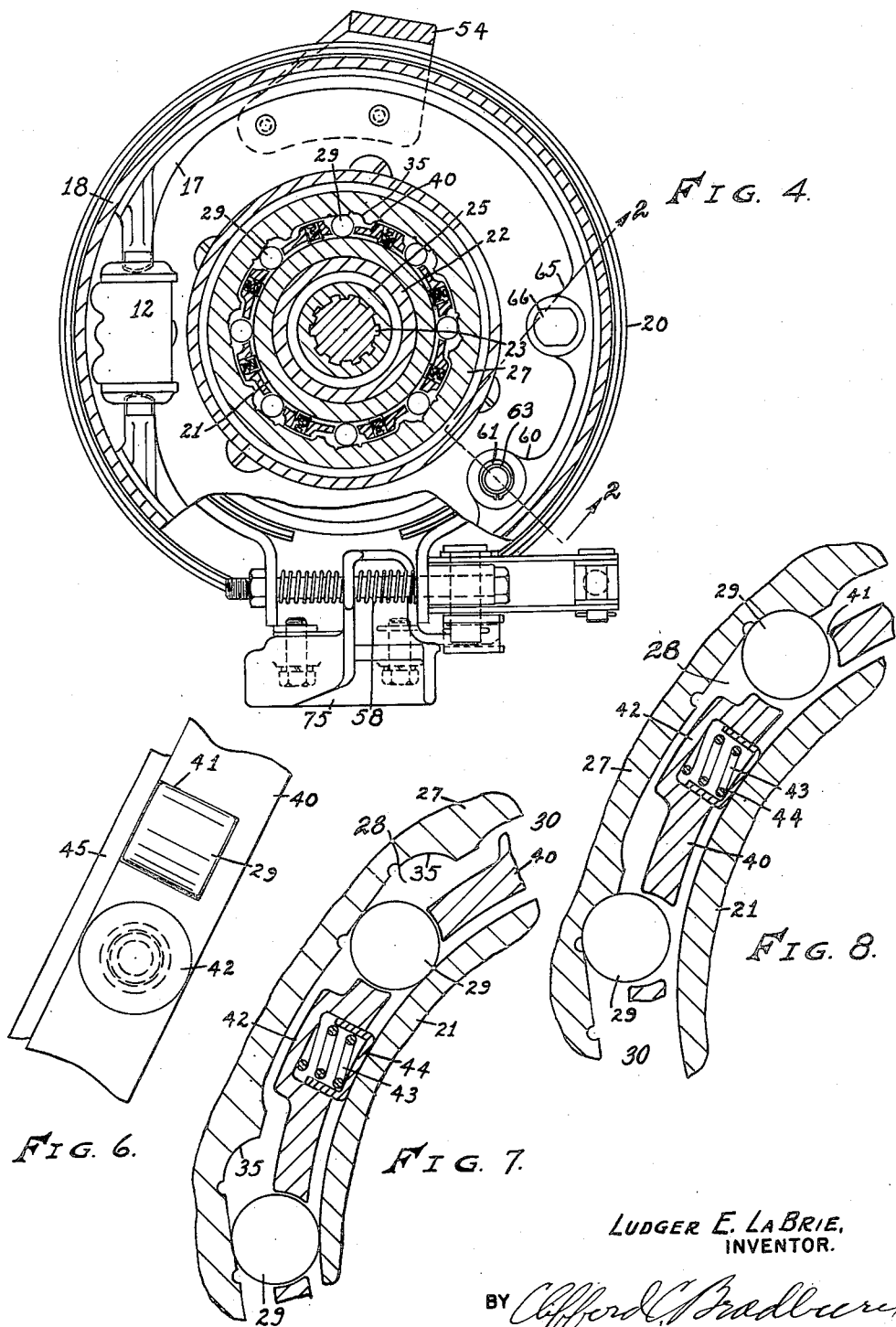

LUDGER E. LaBRIE,
INVENTOR.
BY Clifford C. Bradbury
ATTORNEY.

Patented Dec. 5, 1950

2,532,670

UNITED STATES PATENT OFFICE 2,532,670

BRAKING SYSTEM FOR MOTOR VEHICLES

Ludger E. La Brie, Detroit, Mich., assignor to Hydraulic Brake Company, Detroit, Mich., a corporation of California Application November 20, 1946, Serial No. 711,114

4 Claims. (Cl. 188—18)

My invention relates to braking systems for motor vehicles, and particularly to such systems in which the wheel brakes for retarding forward movement of the vehicle are highly self-energizing. Such self-energizing brakes to be satisfactory must derive a large proportion of their energy from the rotating brake member, and only that portion from the operator as is necessary to prevent the brake from locking under its own energy.

In order to derive the greatest controlled self-energization of wheel brakes within the confines of a particular wheel brake drum, it has been found that the effectiveness of the brakes to stop the vehicle when moving in a reverse direction, or to hold it against such movement, is greatly decreased. The more effective the forward self-energization, the less effective the reverse braking.

The object of my invention is to provide an auxiliary brake which operates to retard the vehicle only in or against reverse motion.

I have illustrated my auxiliary brake as applied to the drive or propeller shaft of the vehicle at a point between the transmission and the differential in conjunction with a parking brake, which, in common practice on heavy vehicles, engages the propeller shaft. In the illustrated embodiment of my invention, all of the brakes, except the parking brake, are hydraulically actuated, though it will be understod that mechanical operation may be substituted for hydraulic operation within the purview of my invention. The mechanically operated parking brake will serve as an emergency brake, or the wheel brake shoes may be connected for mechanical operation in any of the well known ways.

In carrying out my invention hydraulically, I connect a motor cylinder in parallel with the cylinders of the wheel brakes so that the braking elements of the auxiliary brakes will be brought together by the same fluid pressure that applies the wheel brakes. In order that this auxiliary brake will have no retarding effect upon the vehicle in forward movement, I provide one of the brake elements of the auxiliary brake with an over-running or free wheeling feature so that it grips the propeller shaft when the shaft is stationary or when it is rotating in the reverse direction, but does not rotate with the shaft when it rotates in the forward direction. Since motor vehicles are seldom driven in reverse direction for a great distance, or for an extended time, only slight, if any, clearance is required between the braking elements of the auxiliary brake. Therefore, only a very slight amount of brake fluid flows into the cylinder of the auxiliary brake in order to bring about braking engagement between the brake elements.

Propeller shaft braking for forward movement of motor vehicles has the objection that it engages the rear wheels only, which promotes side skidding, and further, that due to the differential connection of the propeller shaft with the rear wheels, all braking effect may be lost when one of the wheels is on ice, or slippery ground, even though the other wheel may have perfect traction.

When a vehicle is moving in a reverse direction, it seldom moves rapidly, or into unfavorable traction conditions. Furthermore, the rear wheels of the vehicle become the forward wheels during reverse motion, under which condition, the effectiveness of the braking is greater than on the other set of wheels. With the use of my braking system for rearward braking, some braking takes place at all of the wheels, but the real effective braking takes place on the propeller shaft, whereas, with the use of my braking system for forward braking, all of the braking takes place at the wheels In the drawings illustrating this invention, Fig. 1 is a schematic plan view of the braking system involving my invention.

Fig. 2 is a side view partially in section of the braking structure of the invention.

Fig. 3 is a sectional view of the brake mechanism taken upon lines 1—1 of Fig. 2 and 2—2 of Fig. 4.

Fig. 4 is a cross-sectional view taken upon lines 4—4 of Fig. 3.

Figs. 6, 7 and 8 are detail sectional views of parts of the roller clutch mechanism.

Figure 5:
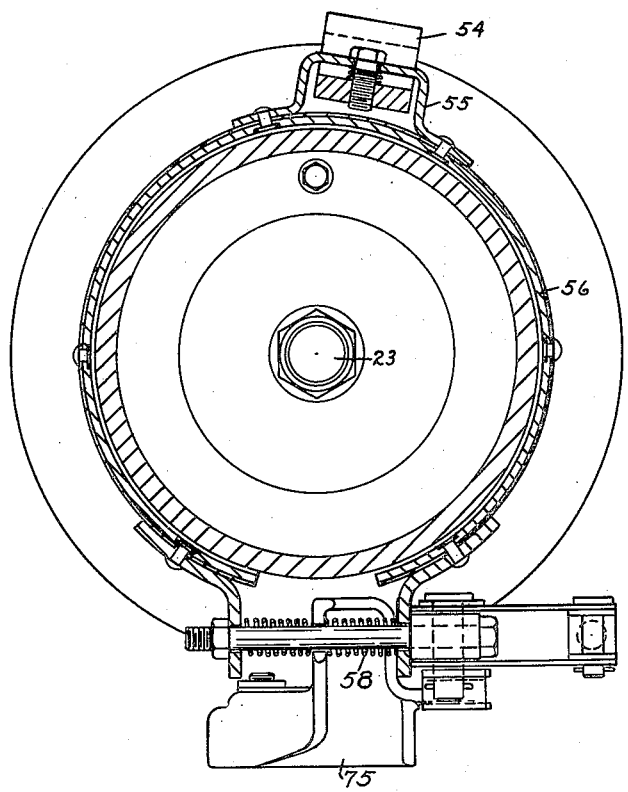
Fig. 5 is a sectional view of the hand brake mechanism taken on line 5—5 of Fig. 2.

In Fig. 1 there is illustrated schematically a four wheel braking system of the self-energizing type such as is fully described in U. S. Patent No. 1,764,178, issued July 17, 1930, to Malcolm Loughead. Reference is made to this patent for complete disclosure of this portion of the braking system. In this system, a master cylinder 5 supplies braking fluid to a pair of cylinders associated with each wheel brake.

Also indicated schematically in Fig. 1 are a transmission gear housing 6, an auxiliary reverse barke 7, and a parking brake 8. The brake 7 is adapted to be operated under hydraulic control by fluid supplied from the master cylinder 5, through a lead 9, in parallel with the leads to the wheel brake cylinders.

Secured to the rear face of the gear housing 6, is a mounting plate 10, which constitutes the support for the mechanism of the auxiliary reverse brake and the parking brake. Secured to the mounting plate 10 is a bracket member 11, supporting a brake fluid cylinder 12, with a hose nipple 13, and a relief valve 14 extending outwardly through an opening, provided in the mounting plate 10. The cylinder 12 provides the pressure for operating pistons connected to opposite ends of a web 17, attached to a brake band for engaging the inner surface of a brake drum 20. The drum 20 is provided with a hub 21, which is rotatably mounted upon a sleeve 22, formed upon the end of the transmission housing 6. A transmission shaft 23 is rotatably supported at one end in a ball bearing 24 secured in the end of the transmission housing 6, upon which sleeve 22 is formed. The transmission shaft 23 is splined and secured thereto and rotatable therewith is a sleeve 25 to which is secured brake drum 26 of the hand brake mechanism.

Secured to the brake drum 26, and surrounding the hub 21 of the brake drum 20, is a sleeve 27. The lower face of this sleeve 27 provides one surface for a roller clutch 28, the other surface of which is provided by the upper surface of the hub 21.

As more clearly shown in Figs. 4, 6, 7 and 8 of the drawings, the roller clutch 28 comprises a cage member 30 in which are supported a plurality of rollers 29—29, adapted to be engaged by the lower surface of the sleeve 27 and the upper surface of the hub 21. The engagement of the rollers 29—29 with the two surfaces is determined mainly by the contour of the adjacent surface of the sleeve 27 carried by the hand brake drum 26. For this purpose, the inner surface of the sleeve 27 is provided with a plurality of cutaway arcuate portions 35—35, equal in number to the rollers 29—29 in the cage 30. The radius of curvature of the arcuate portions 35—35 is the same or slightly greater than the diameter of the rollers 29—29. Between adjacent arcuate portions 35—35, the surface of the sleeve 27 is tapered from the front of one arcuate portion to the rear of the adjacent arcuate portion to an amount where the distance between the lower surface of the sleeve 27 and the upper surface of the hub 21 is less than the diameters of the rollers 29—29.

It will be apparent from this combination above described that when the sleeve 27 is being rotated away from the direction of taper of its roller engaging surface, the rollers 29—29 will, as a result of centrifugal force, be moved into engagement with the arcuate portions 35—35 in the sleeve 27, and out of engagement with surface of the hub 21. As soon, however, as the movement of the propeller shaft 23 is reversed, the relative movement of the hub 21, and the sleeve 27, will be in opposite directions, and this will cause the rollers 29—29 to be moved out of their seats in the arcuate portions 35—35, and into engagement with the opposing surfaces of sleeve 27 and hub 21. The braking pressure exerted between the hub 21 and the sleeve 27 will be controlled by the braking pressure applied to the drum 20.

The rollers 29—29 are maintained in spaced relation by means of a cage comprising a bronze ring 40, provided with slots 41—41, opening through one side of the ring 40, to receive the rollers 29—29, and with bosses 42—42, each provided with a cavity to receive a spring 43. At its lower end each of the springs rests in a cup 44 having a sliding fit with the opening in the boss 42. This arrangement of springs serves to compensate for wear and to maintain the spacing between the adjacent surfaces of the hub 21 and the sleeve 27, and also to provide sufficient friction between the hub 21 and the bearing cage to insure the movement of the rollers into position for engagement with the parts when the reverse braking is being applied. In the assembly of the roller clutch mechanism, a steel guide washer 45 is mounted adjacent the side of the ring 40 and the open ends of the slots 41—41 to provide an end bearing for the rollers 29—29 and retain them against lateral movement.

The roller bearing assembly is mounted concentrically of the hub 21 and retained by a retaining ring 70, bearing against the outer face of the cage ring 40, and secured by a C-spring 71, engaging a slot 46 in the sleeve 27. At the opposite end of the bearing assembly is a U-shaped housing 47, mounted in the inner end of the sleeve 27, and housing a packing strip 48 of suitable material, the upper edge of which is retained in position by a clip 49. A coiled spring 50, located within the housing 47, engages the lower edge of the strip 48 to retain it at an angle to the upper portion of the strip.

A mounting bracket 54 for mounting a support 55 for a hand brake band 56 is secured to the mounting plate 10. A mounting bracket 57 is secured to the lower portion of the mounting plate 10 and supports a hand brake operating mechanism 75 of conventional design in which a leverage system draws the ends of the brake band 56 toward each other against the pressure of a coiled spring 58 which serves to release the brake pressure when the leverage pressure is relaxed.

The brake band 18 is of the internal expanding type and is self-restoring. An extension 60, secured to the brake band web 17, is provided with an opening 61 adapted to receive a stud 62, secured to the mounting plate 10, and carrying an adjustable eccentric member 63, which provides an adjustable stop for the brake band.

A second extension 65, on the brake band web 17, is provided with an elongated opening 66 which may receive a steady pin anchored to the mounting plate 10.

Figure 9:
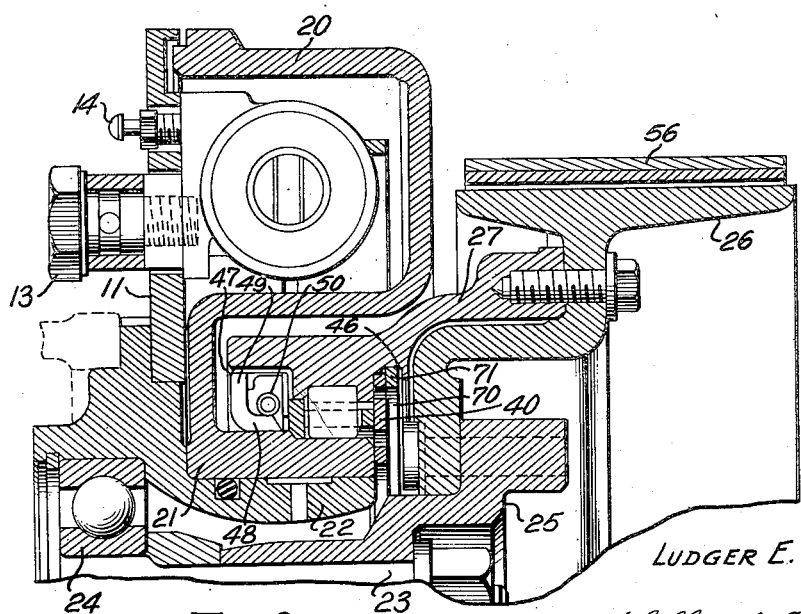
Fig. 9 is a fragmentary sectional view upon an enlarged scale of the upper part of Fig. 3.

With reference to the mechanism as shown in Figs. 3, 4, 7, 8 and 9, the operation of the auxiliary braking mechanism is as follows: When the car is being driven in a forward direction, the transmission shaft 23, as viewed in Fig. 4, will be rotated in a counterclockwise direction. This will cause the roller bearing 29 to engage in the arcuate portions 35 of the sleeve 27 which is rotatable with the transmission shaft 23. This will disengage the rollers 29 from the surface of the hub 21 of the brake drum 20, but the hub will partake of the rotation of the sleeve 27 due to the movement of the cage ring 40 and the engagement of the spring-pressed cups 44 with the surface of the hub 21.

In this relation of the parts, the only frictional resistance opposing the rotation of the sleeve 27 and the transmission shaft 23 in case fluid pressure is applied to stop the rotation of the brake drum 20 and hub 21 will be the slight amount of friction between the cups 44 and the surface of the hub 21, which would not be effective for braking purposes.

When the vehicle is being driven in reverse, the transmission shaft 23 will be rotating in a clockwise direction, looking at Fig. 4, causing the rollers 29 to be moved out of the arcuate portion 35 of the sleeve 27 to close the gap between the sleeve 27 and the periphery of the hub 21. There will be a slight relative movement between the sleeve 27 and the hub 21 equal to approximately the diameter of a roller as soon as the rollers engage the opposite surfaces of the sleeve 27 and the hub 21. The pressure of this engagement, assisted perhaps slightly by the frictional engagement of the cups 44 and the hub 21, will be sufficient to rotate the hub 21 freely in a clockwise direction unless it is restrained by application of braking pressure to the drum 20.

Upon application of braking pressure to the drum 20, there will be a relative rotation of the sleeve 27 and the hub 21, which will cause an increase of pressure between these members and the rollers sufficient to resist the rotation of the transmission shaft and retard or stop the reverse movement of the vehicle depending upon the amount of pressure exerted upon the brake pedal by the driver.

Although I have shown and described my invention with respect to certain details of construction, I wish it to be understood that I am not to be too closely limited thereto, many modifications being possible without departing from the spirit or scope of my invention.

I claim:

1. In a braking mechanism for motor vehicles, a set of hydraulically operated self-energizing wheel brakes self-energizing in the forward but not the rearward movement for retarding the forward movement of the vehicle, an individual cylinder for each of the wheel brakes, a master cylinder, driver operated means for applying liquid from the master cylinder to the individual wheel cylinders, a propeller shaft, a brake drum surrounding the propeller shaft, a hydraulically operated brake band for frictionally retarding the propeller shaft drum, a cylinder for controlling the brake band energized by the driver operated means, and roller clutch means between the propeller shaft and the propeller shaft brake drum operable in the reverse movement of the propeller shaft to engage the propeller shaft and brake drum in driving relation.

2. In a braking system for vehicles, a set of wheel brakes self-energizing in the forward movement only of the vehicle, driver operated means for energizing the wheel brakes, and a transmission shaft brake comprising a brake drum surrounding the transmission shaft and normally freely rotatable thereon, a roller clutch mechanism rotatable with the transmission shaft and adapted in the reverse movement of the transmission shaft to establish a driving connection with the brake drum, and a brake band energized by the driver operated means to establish a braking pressure between the brake drum and the transmission shaft through the roller clutch mechanism.

3. In a vehicle braking system, a set of wheel brakes self-energizing in the forward but not the rearward movement of the vehicle, driver operated means for energizing the wheel brakes, and a transmission shaft brake effective only in the reverse movement of the vehicle and comprising a brake drum surrounding the transmission shaft and normally rotatable with respect thereto, a roller clutch member rotatable with the transmission shaft adapted to be engaged in driving relation to the brake drum in the reverse movement of the transmission shaft, and a brake band for the drum energized by the driver operated means controlling the wheel brakes.

4. In a vehicle braking system, a set of wheel brakes self-energizing in the forward but not the rearward movement of the vehicle, driver operated means for energizing the wheel brakes, and a transmission shaft brake effective only in the reverse movement of the vehicle and comprising a brake drum surrounding the transmission shaft and normally rotatable with respect thereto, a clutch member rotatable with the transmission shaft adapted to be engaged in driving relation with the brake drum in the reverse rotation of the transmission shaft, and a brake band for the drum energized by the driver operated means controlling the wheel brakes.

LUDGER E. LA BRIE.

REFERENCES CITED

The following references are of record in the file of this patent:

UNITED STATES PATENTS

| Number | Name | Date |
|---|---|---|
| 1,749,962 | Straub et al. | Mar. 11, 1930 |
| 1,799,495 | Bendix | Apr. 7, 1931 |
| 1,904,015 | Singer et al. | Apr. 18, 1933 |
| 1,960,358 | Vincent | May 29, 1934 |
| 2,021,574 | Cottrell | Nov. 19, 1935 |
| 2,037,055 | Wills et al. | Apr. 14, 1936 |
| 2,044,197 | Barthel | June 16, 1936 |
| 2,379,829 | Russell | July 3, 1945 |